Aug. 31, 1965 T. C. SODDY 3,203,149
INTERLOCKING PANEL STRUCTURE
Filed March 16, 1960 2 Sheets-Sheet 1
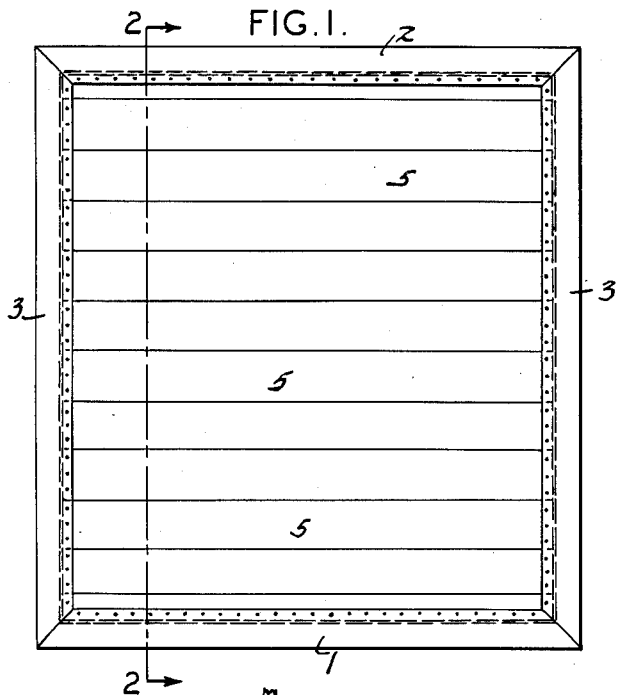
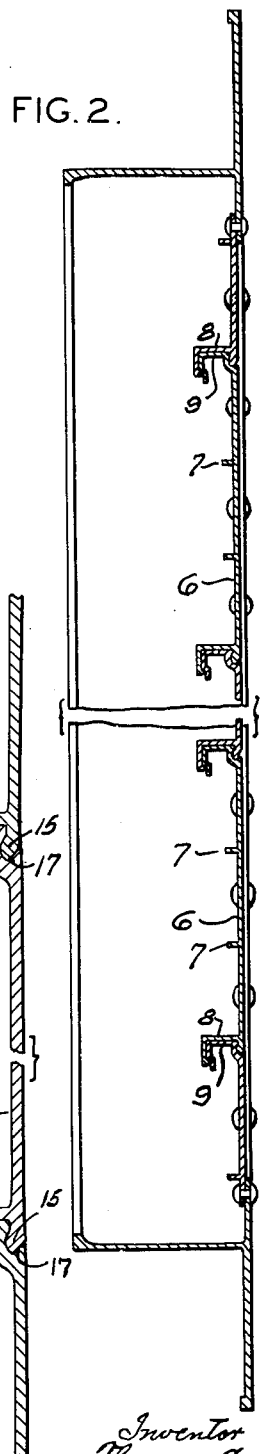
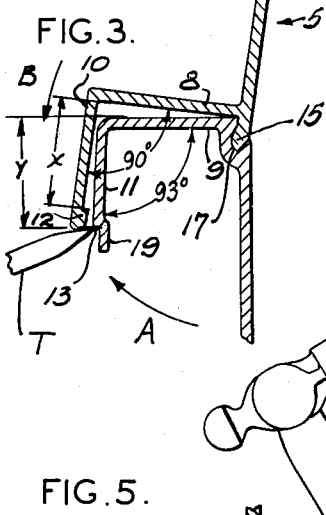
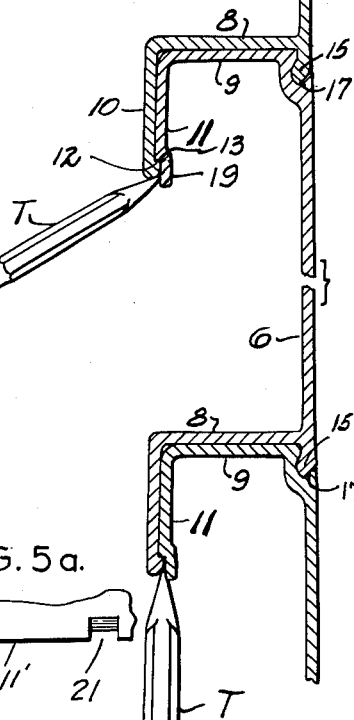
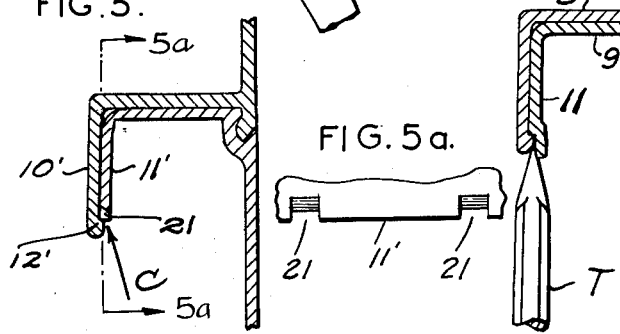
Inventor
Thomas C. Soddy
by Rodney Bedell
atty.

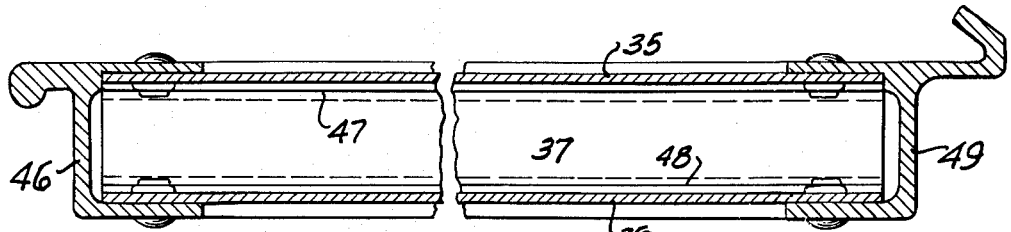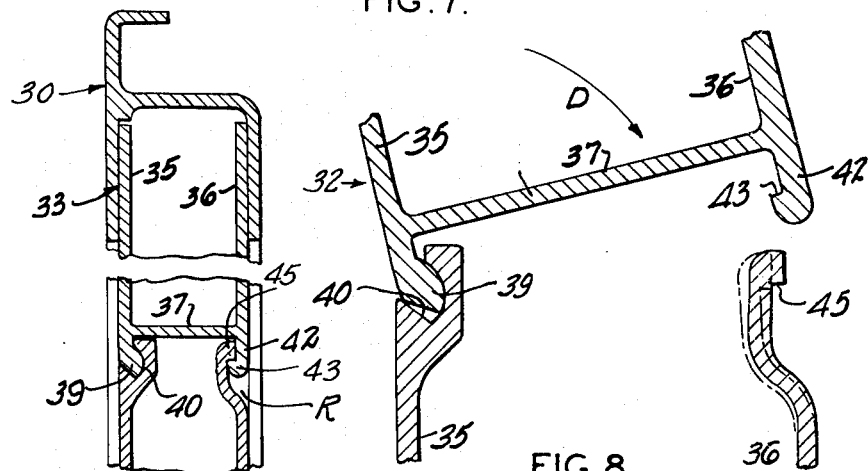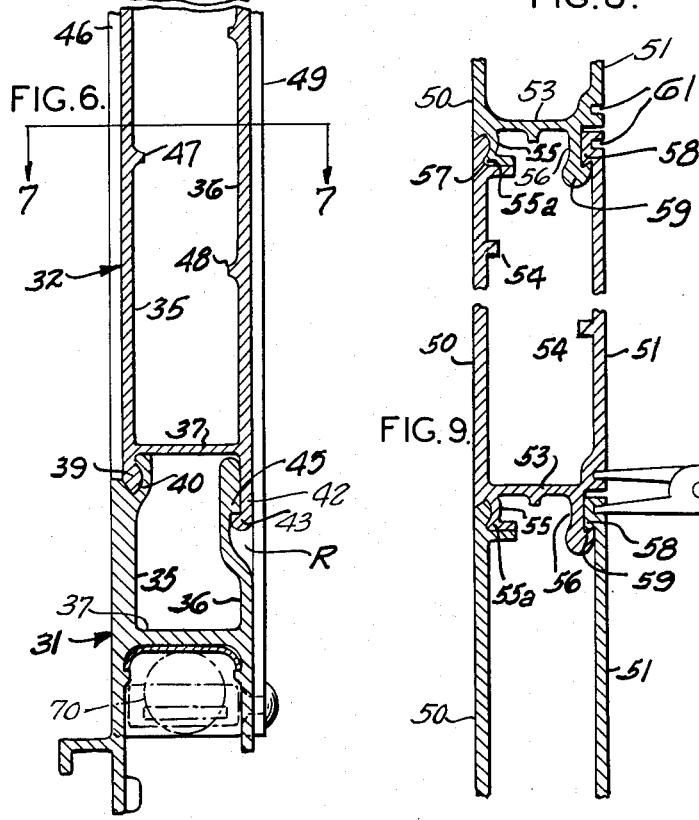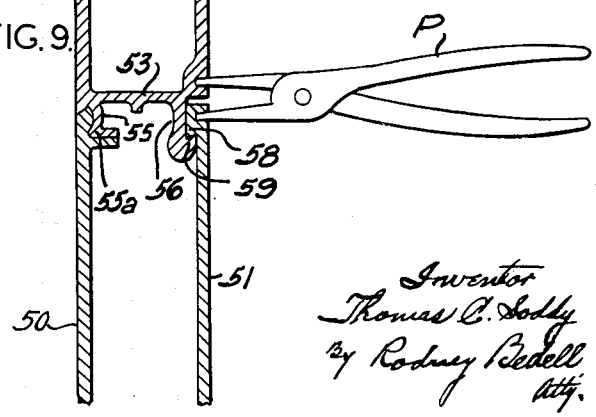

United States Patent Office

3,203,149
Patented Aug. 31, 1965

3,203,149
INTERLOCKING PANEL STRUCTURE
Thomas C. Soddy, Downers Grove, Ill., assignor, by mesne assignments, to American Seal-Kap Corporation of Delaware, New York, N.Y., a corporation of Delaware
Filed Mar. 16, 1960, Ser. No. 15,376
4 Claims. (Cl. 52—593)

The invention relates to the formation of wall-like structure by the use of substantially rigid elongated units of material extruded through a die. Each unit comprises a panel-like body with webs transverse to the body and flanges parallel to the panel and offset from the general plane of the panel. For example, such sections may be formed of aluminum extruded near its melting or softening temperature and are thus produced more economically than by rolling an aluminum billet, and may have acute angles not possible by a rolling operation.

Previously, interengaged abutting flanges of adjacent units have been secured to each other by riveting them together. A more recent innovation has involved the interlocking of internesting marginal portions of adjacent units by slightly distorting one or both of the interengaging parts along abutting elongated edges or margins to form a mechanical interlock which does not require riveting, welding, or other additional fastening means. This contributes to the economy and appearance of a structure so formed. However, such structures have been accompanied by the disadvantage that disassembly of adjacent units has required the practical destruction of the interlocked joint or such deformation of portions of the units as would negate reuse or, at best, detract from the appearance of the reassembled units. In some structures where repair, reassembly or replacement of one or more units is required, it may be as important to be able to disassemble units as it is to have a secure assembly. One example of such need is in the use of assembled extruded metal sections for constructing railway freight car doors which are subject to damaging conditions where a part of the door must be repaired.

One object of the present invention is to make possible the ready assembly of extruded units by an abutting mechanical marginal interlock which will avoid the necessity of securing the units together by riveting, welding, etc., and at the same time be subject to disassembly without destruction or undue distortion of the assembled units during or after assembly.

Another object is to form a double wall structure of extruded material sections in which an abutted edge mechanical interlock holds the units assembled and also provides for disassembly of the units without injury to them.

Another object is to form a rigid structure by interlocking units which cooperate, when assembled, to form a series of box sections. Preferably these units also include the lock release feature mentioned above but such units and their assembly are advantageous irrespective of the presence of this feature. In the following description the invention is explained illustratively in terms of a railway car door. In the accompanying drawings:

FIGURE 1 is an elevation of a railway freight car side door made of extruded aluminum sections.

FIGURE 2 is an upright section on line 2—2 of FIGURE 1 but broken away in part and drawn to an enlarged scale.

FIGURE 3 is a section through two adjacent extruded units during a step in their assembly with each other.

FIGURE 4 shows a series of assembled units showing a step in the separation of the assembled sections.

FIGURE 5 corresponds to one of the joints shown in FIGURE 4 but illustrates another form of the invention.

FIGURE 5a is a detail elevation of the lower margin of flange 11' taken on line 5a—5a of FIGURE 5.

FIGURE 6 corresponds to FIGURES 4 and 5 but illustrates another form of the invention, embodied in extrusion units forming box sections when assembled.

FIGURE 7 is a horizontal sectional view along line 7—7 of FIGURE 6.

FIGURE 8 is a section through two adajcent units as illustrated in FIGURE 6, during a step in the assembly of the units.

FIGURE 9 corresponds to FIGURE 6 but illustrates a fourth form of the invention embodied in extruded units forming box sections when assembled.

The door shown in FIGURE 1 comprises a frame having a bottom rail 1, a top rail 2 and side rails 3 which may be formed of aluminum, steel or other metal, and in themselves do not form an essential part of the present invention. Extending between opposite side rails 3 are a plurality of units 5 each formed of extruded metal and consisting of a plate-like body 6 with reinforcing ribs 7 at intervals throughout its width. The longitudinal marginal portions comprise webs 8, 9 normal to the body and having outboard and inboard terminal flanges 10, 11 respectively. Flange 10 is parallel to the plane of the body or is at an angle of 90° to web 8 and projects downwardly from web 8 outboard of the margin of the body and terminates in an inwardly offset lip 12 forming a shoulder facing toward web 8. Flange 11 diverges slightly from the plane of the body, being at an angle of approximately 93° to web 9 and projects downwardly from web 9 and inboard of the body and has an inwardly and downwardly extending lip 19 forming a shoulder 13 facing away from web 9 and adapted to oppose and interengage lip 12 on an adjacent unit when the two units are assembled, first as shown in FIGURE 3, and then after relative rotation in the direction of arrows A, B, as shown in FIGURE 4. The pivotal connection between the adjacent units is effected by a projecting bead 15 at the base of web 8, having a convex contour, and a concave groove 17 at the base of web 9. Bead 15 is readily received in groove 17 and forms therewith a pivot joint about which the units may swing.

When the adjacent units are swung from the position shown in FIGURE 3 to that shown in FIGURE 4, the elements 12 and 13 are forced past each other either manually or by means of a clamping tool and the two angular marginal portions 8, 10 and 9, 11 snap into position shown in FIGURE 4, forming a friction interlocked joint which will not separate or loosen under normal usage. The friction interlock is due to the fact that the critical width X of flange 10 between web 8 and the opposing face of the shoulder of lip 12 is the same as the critical width Y of flange 11 between the back of web 9 and shoulder 13, whereby when flange 11 is forced to a 90° angle with web 9, instead of its original 93° angle, the metal is distorted by the interengagement of elements 12 and 13. The interlock also results in part from the reverse curved contour of interengaging faces of elements 15, 17 which prevents their separation by pivotal movement about the interengaged edges of flanges 10 and 11.

The joint formed between the angular internested marginal elements of the units is so tight that pressure in opposite directions on adjacent units tending to rotate the adjacent units about elements 15, 17 in a direction opposite to arrows A, B (FIGURE 3) will not be effective.

As indicated above, it may be important to be able to separate the units, and for this purpose there are provided spaced elements along the joint at the outer edges of flanges 10, 11 constituting a crevice between them. In FIGURES 2–4 the spaced elements result from the addition of an extension 19 on flange 11 inclined downwardly from or spaced inwardly from the plane of the outer face of flange 11, so as to project below the lowermost face of lip 12. This accommodates the end of a screwdriver or other wedging tool T between the projection 19 and lip 12 and, upon insertion or rotation of the tool, flanges 10, 11 may be separated without damage and the units 5 freed to disassembling relation, thus effecting one objective of the present construction.

The ends of units 5 are riveted, or welded, to the door side rails 3 and the top and bottom units are secured to the door bottom and top rails 1 and 2.

In FIGURE 5 the same result is attained by sawing or otherwise forming a series of short notches 21 at intervals along the outer edge of flange 11' into which the end of the prying or wedging tool may be inserted, as indicated by the arrow C, and without interfering with the holding effect of the contact between the remaining portion of the extreme outer corner of flange 11' and the opposing lip 12' on flange 10'.

FIGURES 6, 7 and 8 illustrate the same general principle incorporated in deep channel section extruded metal units including a top rail unit 30, a bottom rail unit 31, recessed to house door support balls 70, a plurality of intermediate panel units 32 and an upper panel unit 33, all said units being of double plate type and possessing greater transverse strength than the single plate units previously described and having the additional advantage of forming closed air chambers for insulation between the forward and rear faces. Each of these units would include parallel walls 35, 36 spaced apart and a transverse connecting web 37. Wall 35 of each unit 32 will have a downwardly projecting inwardly convex bead 39 at its lower end and a correspondingly concave outwardly groove 40 at its upper end. This bead and groove on adjacent units provide for their pivotal assembly, when the upper unit 32 moves in the direction of arrow D (FIGURE 8), similar to the pivot assembly of the units shown in FIGURES 3 and 4. The lower end of wall 36 of each unit 32 and 33 terminates in a flange 42 projecting below web 37 with an inturned lip 43 facing upwardly toward web 37. The upper end of wall 36 of each of units 32 and 33 terminates in a downturned shoulder 45 disposed to engage and interlock with the opposing lip 43 on an adjacent unit. This interlock would be substantially the same as that resulting from interengagement of lip 12 and corner 13 shown in FIGURE 4. The upper end of wall 36 at the open margin of the units 31 and 32 may be distorted as shown in broken lines in FIGURE 8 to permit the passing of shoulder 43 past shoulder 45 to interlocking position. When the two units are assembled, the transverse web 37 of one unit will combine with the walls 35, 36 and web 37 of the adjacent unit to form a hollow, tightly enclosed box section. Additional reinforcing ribs 47, 48 may be provided as indicated if the depth of walls 35, 36 is such that reinforcement is desirable.

Units 30, 31, 32 and 33 extend the full length of the door and are riveted or otherwise secured at their ends to door upright front and rear members 46, 49 respectively. If a door unit is damaged, its ends are separated from members 46, 49 and a prying tool inserted in recess R at intervals along the door between adjacent unit walls 36, 36 and the latter disengaged from each other so that the units may be separated by pivotal movement in the opposite direction to that indicated by arrow D.

The end portion of wall 36 which forms shoulder 45 is offset inwardly far enough away from the edge of the wall to provide ample clearance at R for the insertion of the end of an edged prying tool to separate the interlocked elements as previously described.

FIGURE 9 illustrates another form of panel units arranged when assembled to form a plurality of box section panels which are readily separated for repair or replacement. The assembly possesses the advantages inherent in the structure of FIGURE 6 and embodies a more positive interlock between successive panels. In addition, the structure would better resist external loads without unlocking. The general contour of each unit is similar to that shown in FIGURE 6, having inner and outer walls 50, 51, a bottom wall 53, reinforcing ribs 54 and a downwardly projecting rib 55, forming an offset extension of wall 50, and a downwardly projecting flange 56 forming an offset extension of wall 51. The upper end of wall 50 has a part facing toward wall 51 and provided with a recess 57 disposed to receive the projection 55a on rib 55 of the next higher unit. The upper end of wall 51 has an inwardly offset reentrant angle shoulder 58 disposed to engage a similarly shaped shoulder 59 on depending flange 56 of the next higher unit.

While elements 55, 57 correspond generally to elements 39, 40 of FIGURE 6, the presence of the unyielding web 53 between the outwardly facing elements 55, 56, requiring the lateral spreading of the adjacent portions of walls 50, 51, distinguishes from the inwardly yieldable walls 35, 36 as shown in FIGURE 6, makes the assembly better resistant to forces applied in opposite directions to the exterior of the unit.

To release the interlocked parts, a pressure tool P is inserted in grooves 61 in the adjacent ends of walls 51 of two units and the tool is actuated to disengage the interengaged reentrant angle shoulders 58, 59 by relative vertical movement rather than by relative pivotal movement.

The above detailed description relates to railway car doors with elongated units extending horizontally, but it will be understood that the units may be assembled to form wall-like structure for highway trailers, walk-in refrigerators and buildings and that the units may extend vertically and that details of the units and their assembly may be varied otherwise than as described while including the spirit of the invention. The exclusive use of those modifications of the invention coming within the scope of the claims is contemplated.

I claim:

1. A unit for use in a multi-unit transversely-rigid wall-like structure formed of a plurality of units arranged edge to edge in coplanar relation, said unit comprising a wide plate-like body with a relatively narrow rigid web disposed normal to the body along each of two opposite margins, one web having a rigid flange spaced from and substantially parallel to the plane of the body and extending outboard of the adjacent margin of the body and including a flat inner surface of substantial width facing toward the body, there being an inwardly offset lip at the outer margin of said flange forming a shoulder facing toward said one web, the other web having a rigid flange extending transverse of said other web and spaced from the body and extending inboard of the adjacent margin of the body and including a flat outer surface facing away from said plane, there being an inwardly offset lip at the outer margin of said outer surface projecting beyond said first-mentioned lip and forming a shoulder facing away from said other web, the width of said surfaces on both flanges being the same so that the shoulder on the outboard extending flange of one unit may snap over and tightly engage the shoulder of the inboard extending flange of a like juxtaposed unit, said lips forming a crevice for the insertion of the end of an elongated prying tool and also a fulcrum for the tool.

2. A unit according to claim 1 in which the body margin with the web having the outboard flange has a similarly extending convex arcuate bead at the base of that web, and the body margin at the base of the other web has a corresponding outwardly opening concave arcuate groove disposed to pivotally receive the convex bead of a juxtaposed like unit.

3. A railway house car door formed of a plurality of panel units of extruded material each comprising a body of substantial width with straight rigid marginal reinforcing webs normal to the general plane of the body, each web having a rigid terminal flange at its free end extending transversely of the web, said flanges having terminal shoulders parallel to the webs and facing in opposite directions to each other, the web and flange and shoulder of one unit abutting a juxtaposed web and flange and shoulder on the next unit and being respectively male and female and internested and interlocked by snapping of the shoulders of their juxtaposed flanges over each other, the edges of juxtaposed flanges forming a crevice with rigid sides, said crevice being directed away from the unit bodies and shaped to receive the edged end of an elongated tool for prying the abutting shoulders over each other to release the units from their internesting and interlocking relationship.

4. A wall-like structure comprising panel units having wide plate-like bodies disposed edge to edge in coplanar relation with their adjacent edges including interengaged integral pivot elements so the units may swing transversely of their common plane, said bodies having contiguous rigidifying webs along said edges normal to the plane of the bodies and provided with substantially right angle flanges extending parallel to said bodies at the outer ends of said webs, said webs and flanges being internested and in contact with each other, the outer edges of the internested flanges having offset rigid shoulder portions interlocking to positively hold the bodies against swinging movement out of coplanar relation, there being a crevice and projection formed between said shoulder portions substantially throughout the length of the latter and facing away from the adjacent webs and the plane of said bodies and adapted to receive a tool for prying the interlocked shoulder portions apart so that the units may be disassembled by swinging movement about their pivot elements out of coplanar relation.

References Cited by the Examiner

UNITED STATES PATENTS

| | | | |
|---|---|---|---|
| 760,321 | 5/04 | Edwards | 189—86 |
| 1,706,924 | 3/29 | Kane | 189—86 X |
| 1,913,342 | 6/33 | Schaffert | 189—34 |
| 2,019,379 | 10/35 | Anderson | 189—86 X |
| 2,098,717 | 11/37 | Calkins et al. | 189—86 |
| 2,246,075 | 6/41 | Phillips et al. | 20—56.5 |
| 2,449,292 | 9/48 | Gillett et al. | 189—34 |
| 2,902,122 | 9/59 | Beauchamp | 189—46 |
| 2,914,145 | 11/59 | Benson | 189—34 |
| 2,914,146 | 11/59 | Conley | 189—34 |
| 3,043,407 | 7/62 | Marryatt | 189—34 |
| 3,055,461 | 9/62 | De Ridder | 189—34 |
| 3,100,556 | 8/63 | De Ridder | 189—34 |

FOREIGN PATENTS

| | | |
|---|---|---|
| 946,261 | 7/56 | Germany. |
| 684,606 | 12/52 | Great Britain. |

RICHARD W. COOKE, JR., *Primary Examiner.*

CORNELIUS D. ANGEL, JOEL REZNEK, JACOB L. NACKENOFF, *Examiners.*